(12) United States Patent
Diepenbroek et al.

(10) Patent No.: US 8,138,927 B2
(45) Date of Patent: Mar. 20, 2012

(54) FLARE CHARACTERIZATION AND CONTROL SYSTEM

(75) Inventors: Annemarie Diepenbroek, Thornleigh (AU); Joel T. Langill, Phoenix, AZ (US); Isaac Cohen, Minnetonka, MN (US); Kwong Wing Au, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 1029 days.

(21) Appl. No.: 11/689,824

(22) Filed: Mar. 22, 2007

(65) Prior Publication Data

US 2008/0233523 A1 Sep. 25, 2008

(51) Int. Cl.
*G08B 21/00* (2006.01)

(52) U.S. Cl. .......... 340/577; 340/578; 250/554; 431/79; 382/100; 382/191

(58) Field of Classification Search .................. 340/578, 340/577; 250/554; 431/79; 382/100, 191
See application file for complete search history.

(56) References Cited

U.S. PATENT DOCUMENTS

| | | | |
|---|---|---|---|
| 3,517,190 A | 6/1970 | Astheimer | |
| 4,094,632 A | 6/1978 | Reed et al. | |
| 4,233,596 A | 11/1980 | Okamoto et al. | |
| 4,505,668 A | 3/1985 | DiBiano et al. | |
| 4,529,703 A | 7/1985 | Girling et al. | |
| 4,620,491 A | 11/1986 | Nishikawa et al. | |
| 4,871,307 A | 10/1989 | Harris et al. | |
| 6,278,374 B1 * | 8/2001 | Ganeshan | 340/578 |
| 6,937,743 B2 * | 8/2005 | Rizzotti et al. | 382/100 |

FOREIGN PATENT DOCUMENTS

| | | |
|---|---|---|
| DE | 3604106 A1 | 8/1987 |
| JP | 2001256475 | 9/2001 |
| WO | WO 02/25590 A1 | 3/2002 |

OTHER PUBLICATIONS

Tani et al., "A Future Vision of IT-based Systematized Control Room Operation", 2005 Plant Automation and Decision Support Conference. pp. 1-18, Sep. 18, 2005.

* cited by examiner

*Primary Examiner* — Jennifer Mehmood
*Assistant Examiner* — Mark Rushing
(74) *Attorney, Agent, or Firm* — Seager, Tufte & Wickhem LLC

(57) ABSTRACT

A video analytics system for characterization of a flare. A video of a flare may be taken for obtaining information so as to appropriately control the flare in an interest of reducing emissions not necessarily favorable to the environment. The system may incorporate a control scenario involving one or more parameters of a flare which are to be controlled in view of a flare characterization from an algorithmic analysis of the video.

19 Claims, 8 Drawing Sheets

FLARE CHARACTERIZATION AND CONTROL SYSTEM

BACKGROUND

The invention pertains to sensors, and particularly to flare sensors. More particularly, the invention pertains to flare detection, evaluation and control.

SUMMARY

The invention is a flare management system using video capture and analysis of the flare for automatic control of the flare to attain minimum emissions of the flare.

DESCRIPTION

Figure 1:
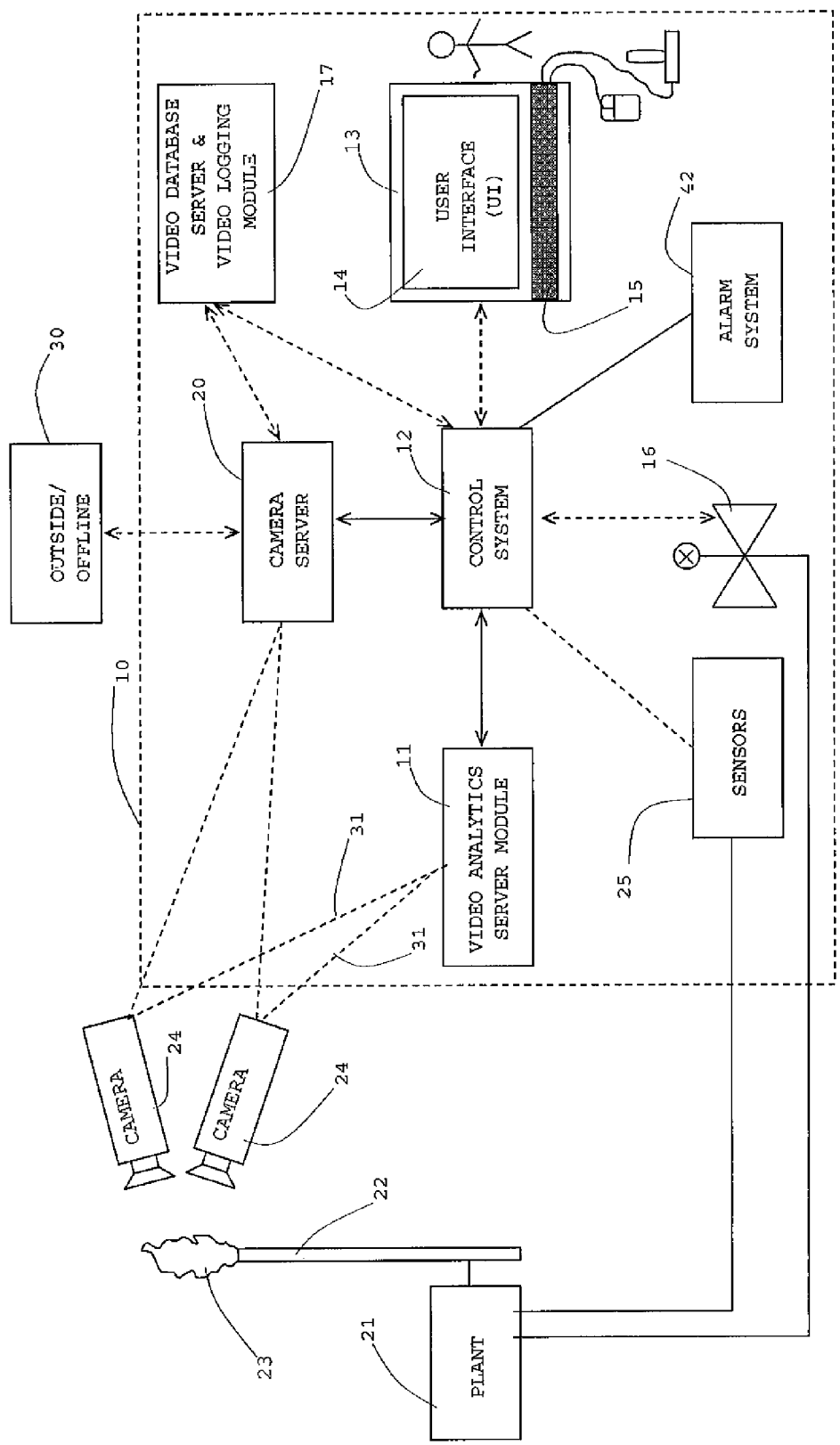
FIG. 1 is a diagram of a flare management system.

The present invention relates to a flare management system that uses video to manage, control and record flares used in industrial processes. Many industrial manufacturing plants generate substantial quantities of waste gases. A frequently used method for disposing of these waste materials is to burn them in what is known as a flare system. Flare systems may be a critical component of industrial plants such as hydrocarbon processing plants because they not only prevent unwanted emissions to be released to the atmosphere, they also eliminate dangerous pressure buildup in processing units during emergency or upset conditions.

A flare system may be distributed throughout the entire plant and includes various elements. The flare system may include control valves that prevent processing units from exceeding a particular design pressure limit, or emergency relief valves or rupture disks that are installed to provide critical protection of a process unit's operating pressure.

The flare system may include a pilot ignition source which ignites the hydrocarbon waste gases. The gases need to be able to completely combust. Incomplete combustions may result in dark smoke emitting from the stack and the release of waste gases into the atmosphere. Depending on the flare type, steam, air or other gases may be injected with the waste gases to improve combustion. For example steam may reduce the flame temperatures to a point that provides optimal burning and assists with the conversion process of flammable hydrocarbons.

Typically, the volume and consistency of the combustible excess gases in the flare system may vary significantly during normal operations, startups and shutdowns of process units and equipment, as well as during emergency or upset conditions, and hence a variable amount of steam may be required. In addition, cross winds may alter the combustion efficiency.

The steam injection control therefore represents significant challenges to the operator that is managing the plant. The results of not adding enough steam are discussed herein. The results of adding too much steam can also be undesirable because a sound pressure wave or "shock wave" may be created resulting in significant noise pollution, and the flame temperature may become below optimal temperature for destruction of some waste gases, and in severe cases oversupply of steam may even snuff the flame.

Flare management approaches aim to reduce air pollution, excessive noise and shockwaves that are associated with the burning of the flare gases. Operational design reviews and flare reports may indicate major deficiencies with the management of flares.

Flare emissions currently tend to be very difficult to measure. Problems may include the effect of the high temperatures on the sensors, the meandering and irregular nature of flare flame, and the high levels of condensations, corrosion and drag forces that occur near the flare that increase mechanical wear on the sensors.

In addition, due to the safety concerns surrounding the flare stack, and the possibility that in the event of a serious plant upset, liquids could actually overflow from the top of the flare stack, a "safety perimeter" may be created around the flare stack. Thus, while the flare stack is in service, no personnel are allowed inside this perimeter. In addition, no instrumentation, including control valves, transmitters, or other sensors should be placed inside this perimeter, since these instruments cannot be serviced or maintained during normal operation of the flare. This means that all of the control and instrumentation equipment need to be installed outside of this safety perimeter. In some processing plants, this perimeter may be as far as 75 to 100 meters from the actual flare stack, resulting in significant dead time in the control response. Related art remote flare sensors typically only measure the existing or non-existence of a pilot flame, and whether the flame includes smoke or not, but fail to detect other key flare characteristics. Without proper monitoring it appears impossible to know whether flares are performing as expected.

The present system and approach may use electro-optics (i.e. visual) and infrared information, captured by one or more video cameras, to determine flare characteristics and to improve flare management. The video cameras may be located at a safe distance of the flare. The flare characteristics may be derived from the cameras using video analytics algorithms and be combined with other plant information such as wind speed and process control system sensors. The flare management system may then present the flare information to the operator controlling the process. The flare management system may provide input to the flare process control loop. The flare management system may accurately record and store flare information for later retrieval and regulatory purposes.

Relate art video images of the flare appear not to be correlated to the process control system that is used to control the flare. Without correlation, an operator would need to view the flare video images and then manually change the process control strategies to optimize the flare when required. During a plant upset, for example, as caused by a blocked valve in a process unit, requiring gas to be diverted to the flare, manual flare management may be particularly difficult for an operator to manage because of information overload that may occur during plant upsets. In this example, the operator would need to manage both the effects of the blocked valve on the process unit affected, as well as the changed flare conditions caused by this plant upset. The present system and approach may automate flare management by automatically using the video images to manage the flare without operator intervention. The present system and approach may automatically capture and store the video images of the flare that are associated with the upset for later retrieval and review and regulatory purposes. The video images may be captured with a digital signature such that they cannot be altered. In this example, the system would allow the operator to focus all attention on the blocked valve that appears to be causing the problem.

FIG. 1 is a diagram of a flare monitoring/management system 10 using video cameras 24 as a process sensor. Flare 23 management may be achieved with a user interface 13, camera server 20, video database server 17, and a video analytics server 11. The user interface 13 of the flare management solution may provide a visual sense of the flare characteristics to the user on a display 14. Users may include the operator that is controlling the plant 21, the process control engineer, plant manager, and others. The user interface may integrate live video images of the flare 23 with the derived flare characteristics and relevant real-time process information including process alarm 42, process value and process trends.

The flare management system 10 may be configured to automatically show the flare 23 to the operator when an alarm 42 occurs in the plant 21 that is related to the flare, thus increasing the operator effectiveness during plant upsets.

The user interface 13 may include an alarm summary display 14 that combines alarms 42 that are associated with the flare monitoring and with the process. This can enable a view of both the process as well as scenes from the cameras 24 with a single user interface 13. The user interface may also enable the immediate retrieval of previously recorded video. Recorded video may enable the operator to compare the current flare characteristics with previously analyzed flare characteristics. Using the user interface, a user may store the current frame of video (snapshot) as a bitmap image file. The file name may be automatically generated by the solution software and include the camera name, date and time of the recording (to millisecond precision). The user interface may be protected by passwords and supports different levels of access ranging from view only to full control of the flare.

The flare monitoring system 10 may include a quick search method for all video that is recorded. The user may select the time indicator which shows a calendar and time line. The user selects the required search period. Video recorded during the selected period will be returned by the search. The operator can add comments to each recording and can later use these comments or part thereof as part of the search strategy.

The flare monitoring system 10 may include a machine learning-based analysis of the flare for automatically relating observed flare to past recording or to specific status of the process. Such mapping of flare observations to process status allows for the automatic characterization of the process status based on the analysis of the observed flare.

User actions may be recorded in a log file. User actions may include cameras 24 that are viewed, video that is replayed, and video control. The log may also include the status of the flare monitoring system components including cameras 24, servers 11, 17 and 20, and other system components. The log of user and system actions may be available in text format and automatically included with any video recordings that are exported.

A camera server 20 may account for communications with the video cameras 24, manage recordings, store recordings, and serve live and recorded video to the user interface 13. Specifically, the camera server 20 may manage live video from the cameras 24, transmit live video to the user interface 13, receive camera control commands from the user interface and then send the commands to cameras 24 (for example, camera pan, tilt and zoom commands), store live video of the cameras, transmit previously stored video to the user interface, archive previously stored video to off-line 30 storage media, retrieve archived video from off-line storage media, and export the recordings so that they can be viewed using standard video player software.

The flare management system 10 may support multiple camera servers 20. More than one camera server may be required when multiple cameras are being used and the number and individual configurations exceed the capacity of a single camera server, or when cameras are geographically distributed.

The video database server 17 may include the information database and run the programs of the solution. The database server may contain a database of the network-connected cameras and their configurations. The server may manage the system database, containing details including the system configuration, camera configuration and settings, recording configuration and settings, details of recordings, schedules, user security details, configuration of the user interface 13, configuration of video analytics that are used to analyse the flare, and communication between the user interface and the camera servers.

The server may also enable alarms or events in the process control system 12 to initiate high resolution recordings, report any camera failures or recording failures to the process control system as an alarm 42, and provide a full audit log of all system status (camera and server availability) and operator actions.

All exported recordings and exported audit logs may be digitally signed. This can ensure proven authentication (origin of the recording and audit log) and integrity (exported recording and audit log have not been altered or tampered with) of the video.

The database server 17 may optionally be used in a redundant configuration to ensure availability for critical flare management applications, using two separate database servers (being executed on separate computers). The backup database server may be continuously synchronised with the master database server to ensure that it is always up-to-date and ready for a fail-over, when required.

The video analytics server component 11 may process video analytics that are used for the analyses of the flare video streams. The video analytics server module 11 may have several modules which perform flame monitoring, flare volume estimation, and heat content and combustion efficiency analysis. In flare monitoring, the use of video cameras 24 (one or multiple) monitoring the flare may permit one to characterize the properties of the underlying physical process. Analysis of the flare color, shape and their variation over time appear critical in real-time analysis of the combustion efficiency. Video cameras 24 may be used as a remote sensing tool that allows the operator to optimize the combustion process.

In flare volume estimation, the use of a video sensor 24 for monitoring the flare may be used to infer the volume of the flare. Two approaches may be used to estimate the volume of the flare and its temporal variations.

From a single camera 24, the computation of the silhouette 71 (i.e., outline) of the flare (by motion detection, or by spatio-temporal segmentation of the edges in the scene, or by layer-based segmentation of the image, . . . ) may be used for estimation of the volume of the flare 23. Second, one may use an approximation of the 3D shape of the flare using a generalized cylinder (GC). GC is uniquely defined by its medial axis 72 and edges or a silhouette 71. The 3D surface of flare may then be parameterized by the following equation.

$$S(u,v)=A(u,v)+R(u,v)*B(u,v)$$

where A(u,v) is a parameterization of the medial axis, B(u,v) is the "binormal" at the point A(u,v) and R(u,v) is the radius of the cross-section 73 at A(u,v). The medial axis 72 may be defined as points inside the flare 23 that are at equidistance from the edges 71 of the flare (i.e., the silhouette 71). The cross-sections 73 of the "generalized cylinder" (GC) may be inferred from the silhouette 71 of the flare 23.

Figure 2:
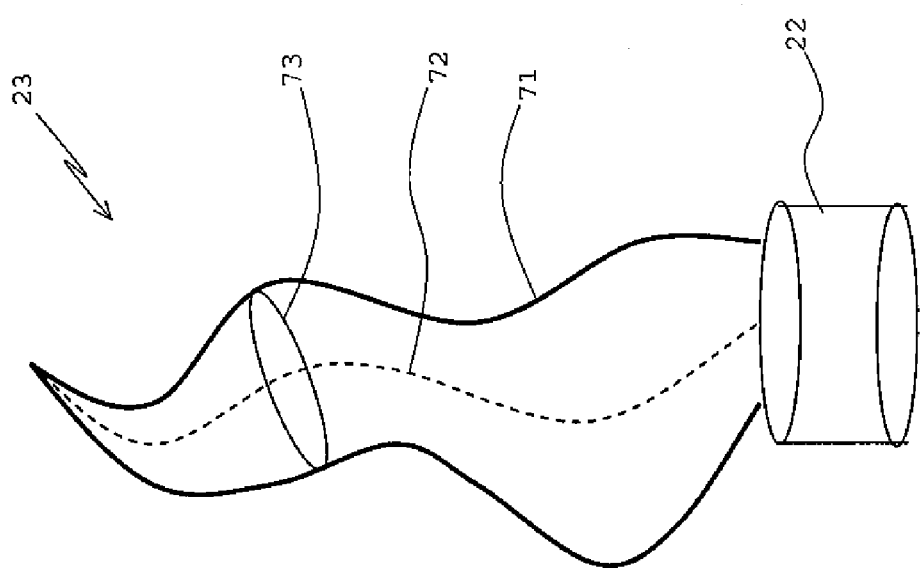
FIG. 2 shows an example of the use of a generalized cylinder (GC) for representing the three-dimensional (3D) surface of a flare.
Figure 3:
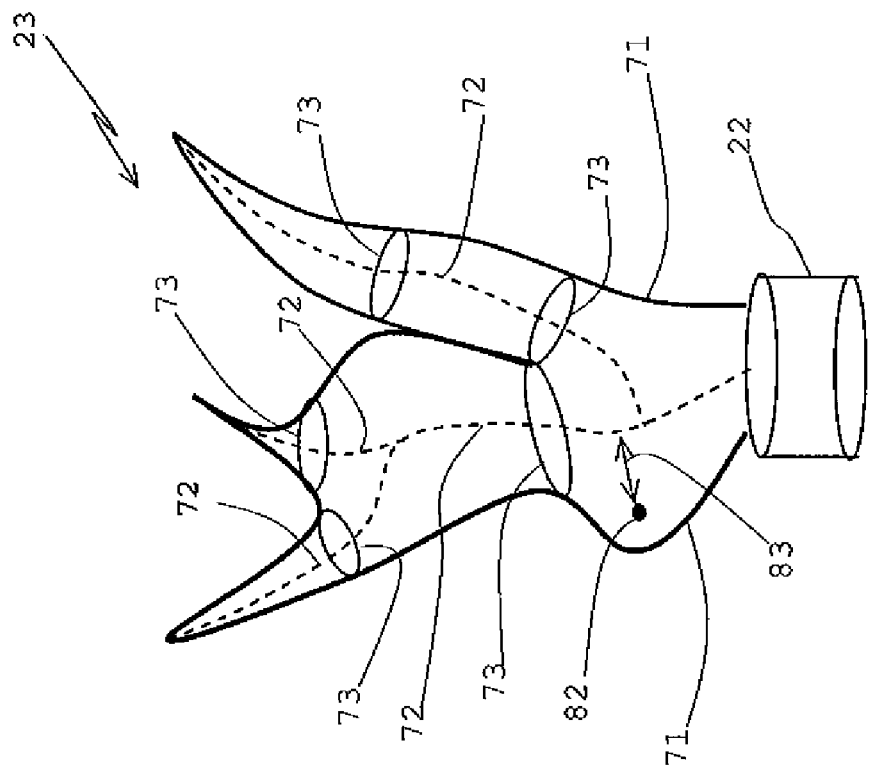
FIG. 3 shows an example of a complex flare modeled by a GC.

An example is shown in FIG. 2 where a simple medial axis 72 is displayed. FIG. 3 shows a more complex case, where an implicit representation of the flare 23 appears more suitable due to the complexity of the topology of the flare.

In these cases, a parameterized or an implicit flare 23 surface description may be inferred from the silhouette 71 and the medial axis 72. Using intrinsic camera 24 calibration information (i.e., pixel size, pixel ratio, center of projection), may allow one to map pixel size to physical measurement. This analytical representation of the surface, along with intrinsic camera parameters, may then be used for estimating the volume the flare 23 by estimating the volume of the corresponding GC. FIG. 2 shows an example of the use of a generalized cylinder for representing the 3D surface of a flare. FIG. 3 shows an example of a complex flare modeled by a generalized cylinder.

From multiple cameras, another approach may consist of using two or more cameras 24 for monitoring the flare. These cameras may correspond to various vantage points and provide a more accurate estimation of the 3D shape for the flare.

In the case of two synchronized cameras 24, one may again use a GC-based representation in the case of an anisotropic GC model which appears appropriate for accurately characterizing the shape of the flare in the presence of strong crosswinds, or during transitional phases of the flame 23. In this case, one may integrate the information from two silhouettes 71 by matching corresponding cross sections 73. The matching may be driven by the knowledge of the epipolar geometry relating the two views. Epipolar geometry appears sufficiently described herein in conjunction with the description for the present invention. However, another description may be found in Hartley and Zisserman, "Multiple View Geometry in Computer Vision", Cambridge University Press.

The epipolar geometry may be the intrinsic projective geometry between two views. It may depend on the camera 24 intrinsic parameters and relative pose, and be independent of the scene structure. The epipolar geometry may be encapsulated by a fundamental matrix which is a 3×3 matrix of rank 2. If a point P in 3D space is imaged at p in the first camera 24, and p' in the second camera 24, then the image points may satisfy $p'^T F p=0$.

The estimation of the epipolar geometry may be done manually by the operator by selecting seven or more matching anchor points across the cameras, or using an automatic estimation of the epipolar geometry based on the automatic extraction and matching of salient feature points in the scene.

The epipolar geometry constraint may hold for any 3D point in the scene viewed by two or more cameras 24. If one considers an approximation of the 3D surface in the scene by a GC, one can relax the epipolar geometry constraint and derive similar equations for points in the 3D surface that lie along the same cross section 73. This approach is depicted in FIG. 4.

Figure 4:
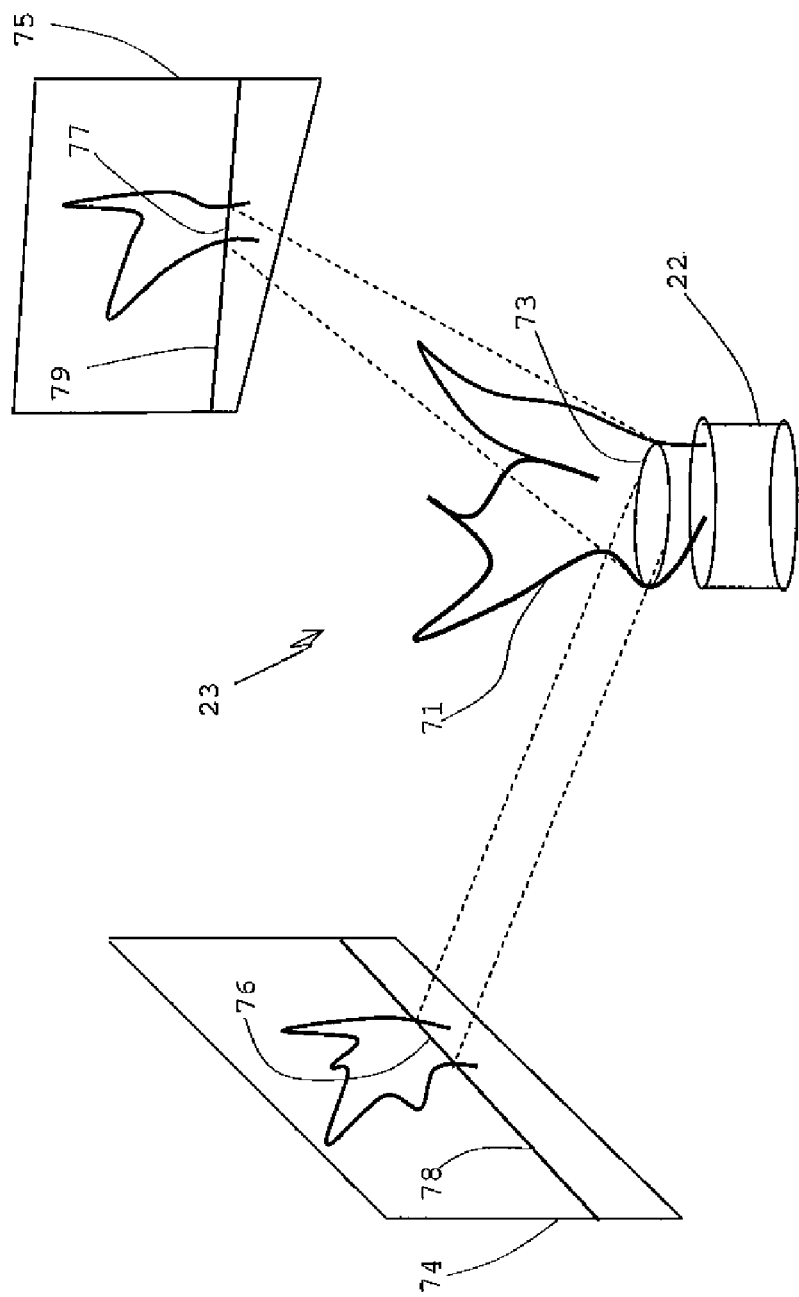
FIG. 4 shows a 3D approximation of the geometry of the flare using a GC.

FIG. 4 shows a 3D approximation of the 3D geometry of the flare using a GC. The Figure is an illustration of the projection of the flare 23 into two views 74 and 75 of first and second cameras 24, and the corresponding cross sections 76 and 77 of the projected silhouette 71 with the epipolar lines 78 and 79, respectively.

Figure 5:
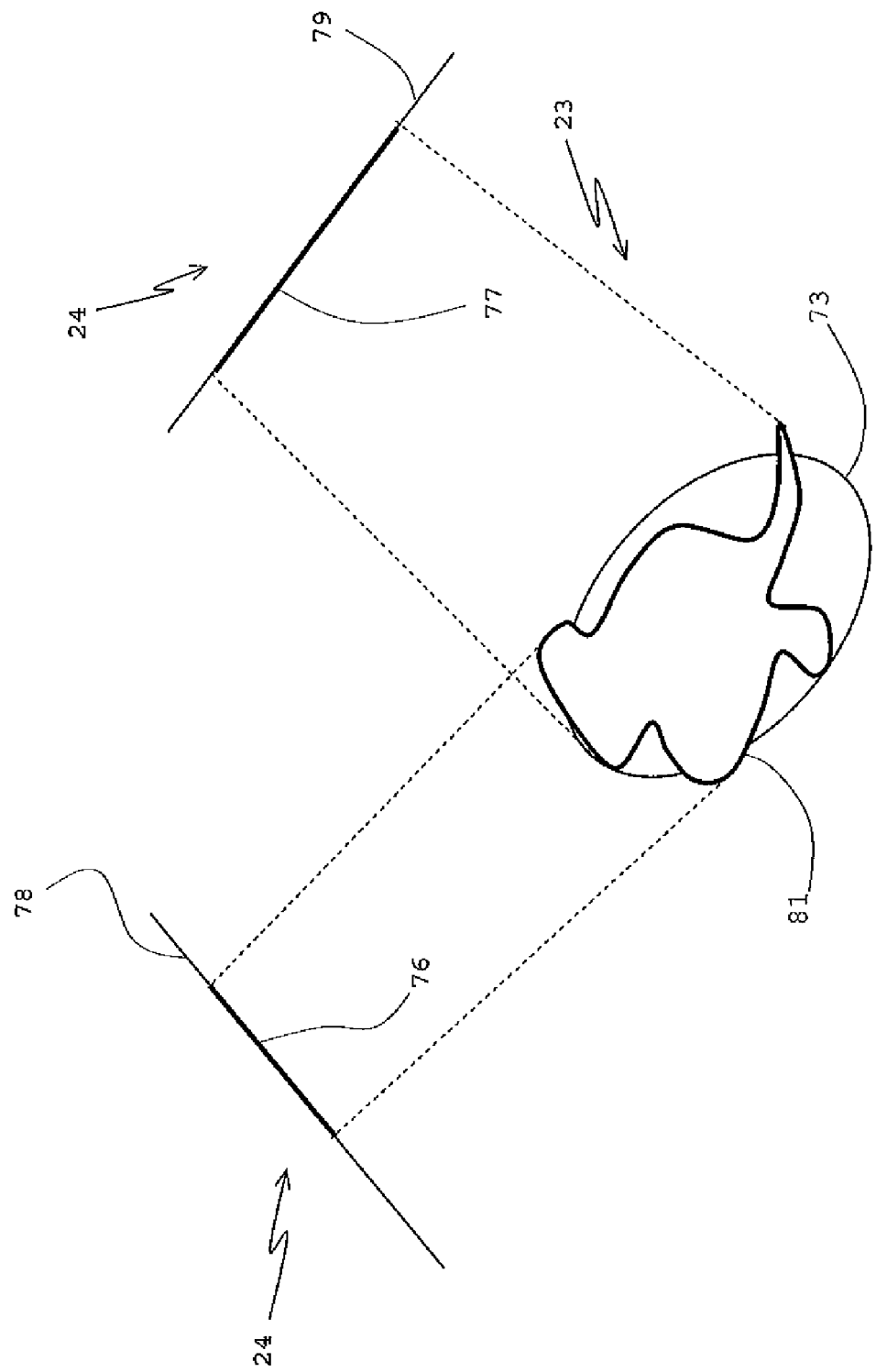
FIG. 5 shows a top view of the 3D GC-based approximation of the geometry of the flare from several views.

The cross sections 76 and 77 may here be defined by the intersection of the projected silhouette 71 with the epipolar lines 78 and 79, respectively. This is illustrated in FIG. 5. This result is valuable in that it may allow the reconstruction of GC from various projection of its 3D silhouette 71. This is illustrated in that it depicts a top view of the present approach. One may use an analytical representation of the GC to estimate the volume of the flare 23. FIG. 5 shows the top view of the 3D GC-based approximation of the 3D geometry of the flare from two views 74 and 75.

In a case having a larger number of synchronized cameras 24 monitoring the flare 23, 3D shape estimation from silhouettes 71, 81 may be used for estimating accurately the volume of the flare. Silhouette 81 is in essence a cross section of the 3D flare 23 viewed from above. Cross section 73 is that of a GC approximation of the 3D surface of the flare. In this case, one may rely on a triangulation of the 3D surface to estimate the corresponding volume.

Another module of the video analytics 11 may include heat content and combustion efficiency. The combination of the estimated 3D shape of the flare 23, the analysis of its shape, and the analysis of the colors can be used for characterizing the flame properties. Color analysis, along with 3D shape characterization can provide an accurate assessment of the heat content of the gas, the combustion efficiency, the $NO_x$ emissions . . . .

The present approach may be based on a localized analysis of the shape and color information provided by the video sensors 24. One may use a covariance-based metric that allows taking into account several point-based measurements, and developing a location-dependent analysis of the color. The definition of a location-dependent descriptor of the colors of the flare may provide the capability to analyze several color profiles, and identify specific behaviors that are dependent of the position the color features. These measurements may include the following.

$$M(i,j)=[d(i,j),R,G,B,R_x,R_y,G_x,G_y,B_x,B_y]$$

where i,j correspond to the position 82 in the image of FIG. 3 at the location that the measurement is taken, d(i,j) corresponds to the distance 83 of the pixel i,j to the closest medial axis 72 of the flame 23, the corresponding R, G, B color, their gradients. One may also consider better color representation such as "hue saturation value" representation of the color as indicated by the following.

$$M(i,j)=[d(i,j),H,S,V,H_x,H_y,S_x,S_y,V_x,V_y]$$

where i,j correspond to the position 82 in the image at the location where the measurement is taken, d(i,j) corresponds to the distance 83 of the pixel i,j to the closest medial axis 72 of the flame 23, the corresponding H,S,V color, and their gradients. This feature vector may be augmented with other geometric descriptors of the flare such as the distance to the medial axis 72 of the 2D silhouette . . . .

The color descriptor of the flare 23 may then be encoded in the auto-covariance matrix, $$C = \sum_{i,j} (M(i, j) - \overline{M})(M(i, j) - \overline{M})^T,$$

where $\overline{M}$ is the average vector.

The color properties of the flare may fluctuate dependent on the chemical content and the underlying combustion process. The monitoring of the flare status may be performed by comparing the observed color properties (represented through the auto covariance matrix) and a set of past observations or reference profiles. For this purpose, one may use the Frostener distance measure to compare two matrices using the following metric, $$d(A, B) = \sqrt{\sum_{i=1...N} \ln^2 \lambda_i(A, B)},$$

where, A and B are two instances of the flare color descriptors, and $\lambda_i(A,B)$ includes the generalized eigenvalues obtained by solving $|\lambda A - B| = 0$.

A classification of the color properties of the flare 23 may be done using methods such as "support vector machine", "k-nearest neighbor clustering" or similar tools that allow comparing new observations to models or templates built from a collection of previous observations.

The solution may support one or more cameras 24. There appears to be no limit to the number or type of cameras that can be supported. The cameras may communicate with the other components of the flare monitoring system 10 via wireless communication. The flare 23 and associated cameras 24 may be located at unmanned or remote locations.

Figure 6:
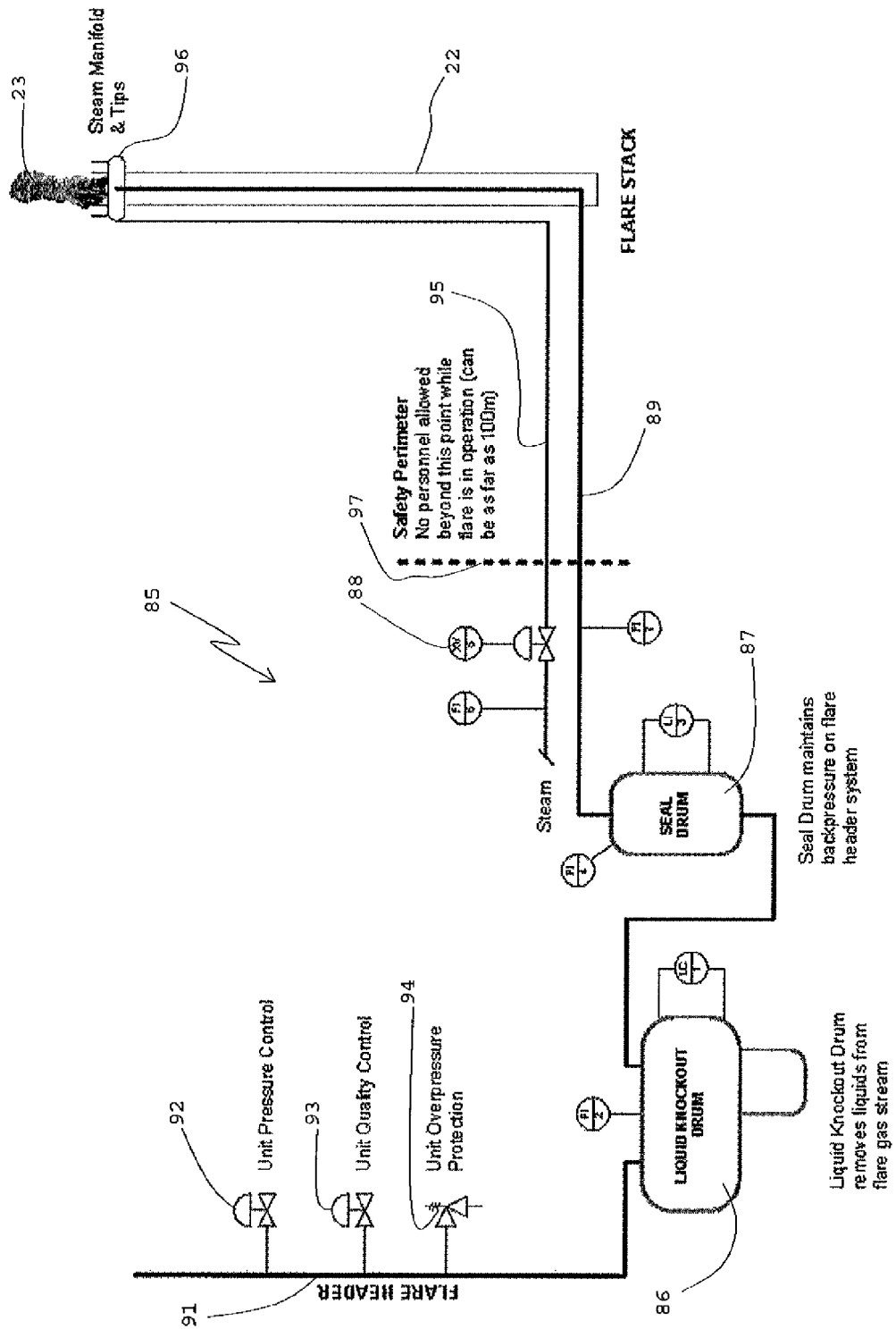
FIG. 6 is a diagram of a process control system that illustrated a flare control strategy.

The process control system 85 of a plant may monitor and control industrial sites using integrated controllers. It may provide a real-time view of the status of the control system to operators. The process control system may control the flare system. An example of a flare control strategy is illustrated by the process control system 85 in FIG. 6. In the strategy shown, the liquid knockout drum 86 may be installed to remove any unwanted liquids that may have entered the flare gases or flare gas stream. These liquids are usually returned to the plant's slop system for reprocessing.

The flare gases may then be transported through a seal drum 87. This drum is essentially a simple liquid filled tank, providing a seal that requires a specific amount of pressure for the vapour to break through or "burp" prior to entering the flare stack 22 piping. The seal drum may ensure a minimum amount of pressure on the flare header 91 and prevent air from entering the header, which could lower the hydrocarbon vapour concentration in the header below the upper explosive level (UEL) and result in an explosion. Unit pressure control 92, unit quality control 93 and unit overpressure protection control 94 may be connected to flare header 91. A safety perimeter 97 may be placed around the flare stack 22. No personnel are to be allowed between the perimeter and the flare stack while the flare 23 is in operation. The distance between the perimeter 97 and the stack 22 may be from 75 meter to 100 meters.

The present control strategy may use the information collected around the seal drum 87 as a method of providing a feed-forward signal to the steam control valve 88. The flare characteristics that are derived from the cameras 24 using video analysis algorithms may be combined with an accurate measurement of hydrocarbon in the flare piping 89, thereby providing an excellent way of trimming the amount of steam injection. Steam controlled by valve 88 may go to a steam manifold 95 and tips via line 96.

FIG. 1 is a diagram of the flare management system 10. A plant 21 with a stack 22 and corresponding flare 23 from it to be managed is shown. A camera or several cameras 24 may be directed toward the flare for video observation. The video observation may be recorded in system 10. A connection between system 10 and camera or cameras 24 may be wired or wireless. Signals 31, digital and/or analog, from the camera or cameras 24, may go to a video analytics module 11. These cameras may detect visible, infrared and/or ultra-violet light from flare 23. Module 11 may record the video. The video from the camera or cameras 24 may be converted to a digital format, if received in an analog format. A camera server may be connected to cameras 24 and control system for camera and video data control. The video may be analyzed to determine contents and parameters of flare 23. The module 11 may provide analysis results to a user interface 13 via a control system 12 or directly to the interface 13. The user interface 13 may have a video screen or display 14 and a keyboard 15. Keyboard or mechanism 15 may include a mouse, a joystick, a touch screen, and/or the like. A user may monitor and control the plant 21 and flare 23 at the interface 13. The monitoring and controlling may be via the control system 12 and plant controller or controllers 16, including valve mechanisms. Control system 12 may have a processor to facilitate an interaction between the user interface 13, the analytics module 11 and controllers 16. The user interface 13 may contain a computer or it may have electronics just sufficient to effectively connect the display 14 and keyboard 15 with control system 12. Controller or controllers 16 may have processors for control and monitoring of various plant 21 parameters. Control of the parameters may include control of those having an effect on the flare 23. These parameters may be detected by sensors 25 which may be connected to control system 12.

Also connected to control system 12 may be a video database server and video logging module 17 with or without a digital signature. Video information may be recorded, labeled and the like in module 17 for comparison and analysis by module 11. The user interface 13, controller 16 and video logging module 17 may have wireless or wired connections to control system 12. Further, wireless or wired connections may be among interface 13, controller 16, module 17 and camera server 20.

Describing flare management from another aspect using video may be achieved via a combination of various components which includes the user interface 13, a camera server 20, a video database server 17, video analytics server 11, one or more cameras 24, sensors 25, alarm system 42 and a process control system 12, as noted in FIG. 1.

The user interface 13 for the flare management solution may provide a visual sense of the flare characteristics to the user. The user interface may integrate live video images of the flare with the derived flare characteristics and relevant real-time process information and process trends. The user interface may also enable the immediate retrieval of previously recorded video. Recorded video can permit the user to compare the current flare characteristics with previously analyzed flare characteristics. The user interface 13 may be protected by passwords and support different levels of access ranging from just viewing to full control of the flare 23.

The camera server 20 may cover communication with the video cameras 24, manage recordings, store recordings and serve live and recorded video to the user interface 13. Particularly, the camera server 20 may manage live video from the cameras 24, transmit live video to the user interface 13, receive camera control commands from the user interface and then send the commands to cameras 24 (for example, camera pan, tilt and zoom commands). The server 20 may also store live video to hard disk, such as that of module 17, transmit previously stored video to the user interface 13, archive previously stored video to off-line storage media at outside 30, retrieve archived video from off-line storage media, and export to the outside 30 the recordings so that they can be viewed using third party video player software. The camera server 20 may rely on the database server 17 for camera database information. The outside 30 may be connected by camera server 20 or other components of system 10 via wireless, wire, or a combination of wire and wireless. Such connections may use cable, internet, phone, optics, RF, and so forth.

The present system 10 may support multiple camera servers. More than one camera server 20 may be required when multiple cameras 24 are being used and when the number and individual configurations exceed the capacity of a single camera server, or when the cameras are geographically distributed.

The video database server 17 may include the information database and run programs of the system. The server may contain a database of the network-connected cameras 24 and their configurations. The database server 17 may manage the system database, containing details including the system configuration, camera configurations and settings, recording configuration and settings, details of recordings, schedules, user security details, configuration of the user interface 13, and the configuration of video analytics 11 that are used to analyse the flare 23.

The video database server 17 may also manage communications between the user interface 13 and the camera servers 20, enable alarms 42 or events in the process control system 12 to initiate recordings, report any camera failures or recording failures to the process control system, and provide a full audit log of all system status (camera and server availability) and operator actions.

The database server 17 may optionally be used in a redundant configuration to ensure availability for critical flare management applications, using two separate database servers 17 (being executed on separate computers). The backup database server may be continuously synchronised with a master database server to ensure that it is always up-to-date and ready for a fail-over, when required. There generally may be just one database server or a redundant database server pair in the flare management system 10.

The video analytics or analysis server module 11 may process the video analytics that are used for the analyses of the flare video streams. The system 10 may support one or more cameras 24. The process control system 12 may monitor and control industrial sites using integrated controllers 16. It may provide a real-time view of the status of the control system to operators.

The flare management system 10 may use digital video. Live output from cameras 24 may be viewed through the user interface 13. The user interface may support a flexible variety of views to enable the user to select the view that best fits the situation of the flare 23. For example, during normal situations, the user may be using a view that only shows alarms of system 42 associated with the flare, while during an abnormal situation the user may want to view the flare constantly.

The system 10 may support the following situations. When an alarm 42 occurs in the process control system that is related to the flare 23 management, the live video output of the camera 24 associated with that alarm may be switched directly to a dedicated monitor 14. The user may acknowledge the alarm to clear the monitor.

There may be various aspects to controlling the flare cameras 24 and camera stream storage. From the user interface 13, the user may zoom, turn or focus the camera using a joystick or other pointing device such as a mouse or touch screen of mechanism 15, and the user may start and stop the recording of live video. From the interface or station 13, the user may store the current frame of video (snapshot) as a bitmap image file. The file name can be automatically generated by the solution software and include the camera name, date and time of the recording (to millisecond precision). From the user interface, the user may zoom, turn or focus the camera using a joystick or other pointing or directing device such as a mouse or touch screen of mechanism 15.

Figure 7:
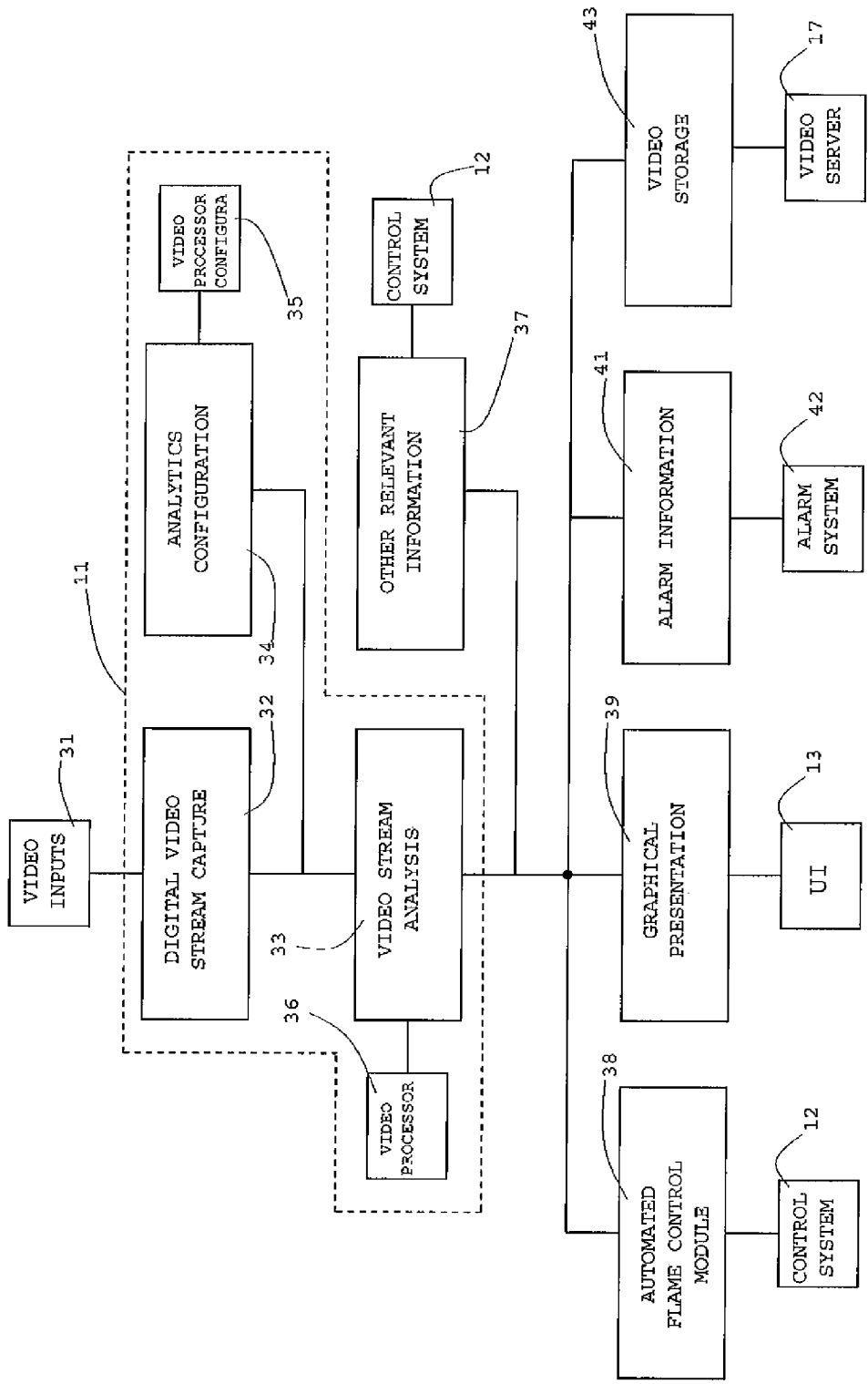
FIG. 7 is a diagram of various actions of the flare management system it relates to video observation, analysis and control of a flare.

FIG. 7 is a diagram of various actions of system 10 as it relates to observation, analysis and control of flare 23. Video inputs 31 may come from camera or cameras 24 and become part of a digital video stream capture 32. If the inputs 31 may be converted to a digital format if in an analog format. The digital video stream may become a part of a video stream analysis 33. Also, incorporated in the video stream analysis 33 may be an analytics configuration 34 which includes, at least in part, configuration information 35 of a video processor 36. The digital video stream capture 32, video stream analysis 33, analytics configuration 34, video processor configuration 35 and video processor 36 may be a part of the video analytics module 11. Analysis information 33 about the flare 23, along with other relevant information 37 from control system 12, may be provided to an automated flare control module 38 which is connected to control system 12. Information 33 and 37 may also be provided as a graphical presentation 39 to the user at the interface 13. Information 33 and 37 may be provided as alarm information 41 for the user and an alarm system 42. Information 33 and 37 may be saved in a video storage 43 which is managed by a video server 17. Video storage 43 and the video server 17 may be a part of the video logging module 17. Storage 43 and server 17 may also be, in some designs, a part of a storage area in the video analytics module 11, the control system 12 and/or the user interface 13.

Figure 8:
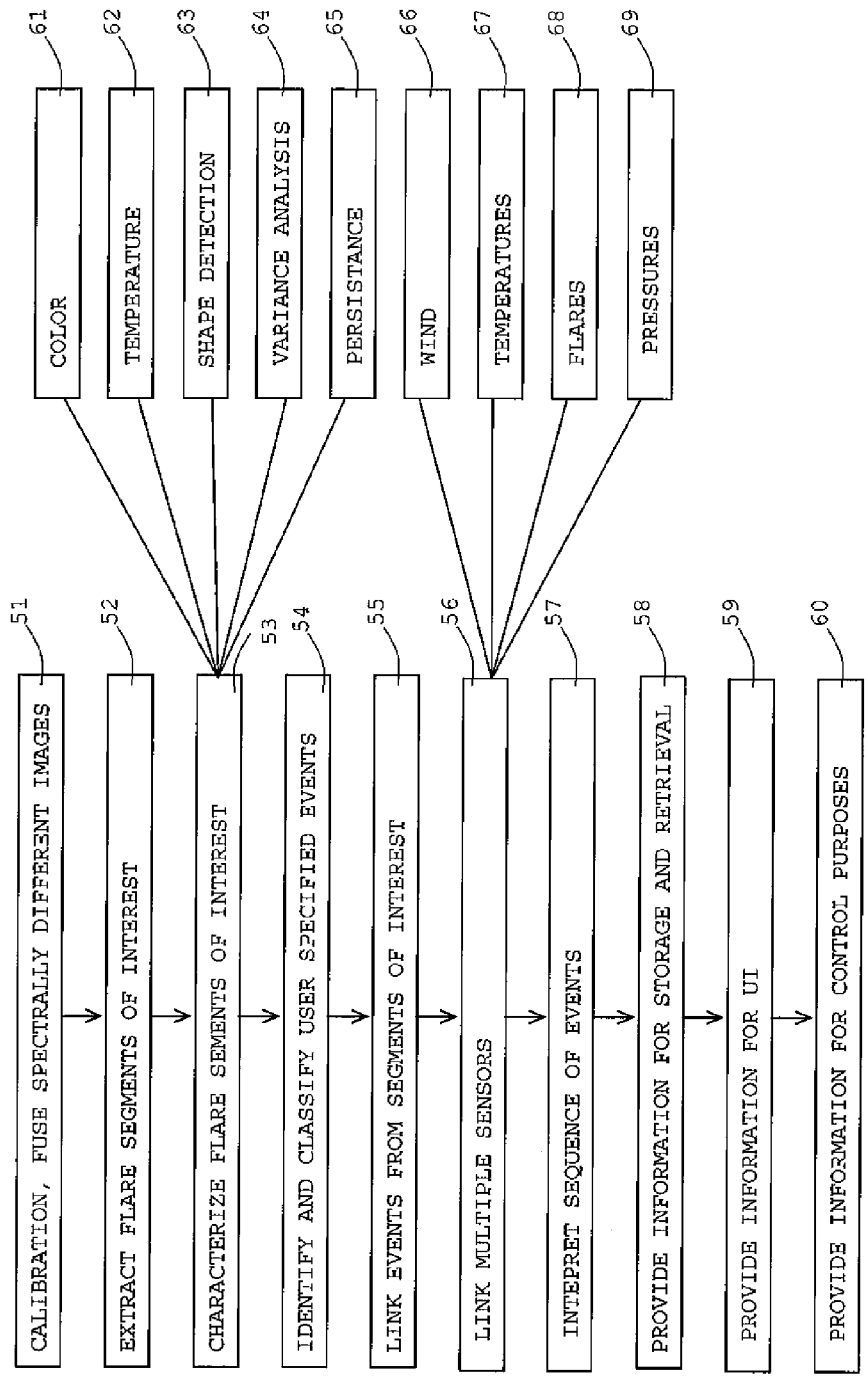
FIG. 8 is a diagram of activities related to a video analytics server module of the flare management system.

FIG. 8 is a diagram of activities related to and in the video stream analysis 33 of module 11. From the video inputs 31 and corresponding digital stream 32, various or spectrally different images may be calibrated and fused at step or stage 51. Then at stage 52, flare segments of interest may be extracted from the images of stage 51. These segments are analyzed and characterized according to color 61, temperature 62, shape 63, variance 64 and persistence 65 at stage 53. These characteristics are used to identify and classify user specified events at stage 54. At stage 55, events from multiple flare segments of interest may be linked temporally and spatially. In stage 56, results and readings from multiple sensors may be linked. These sensors, among others, may include those for wind 66, temperatures 67, flares 68 and pressures 69. With information of the sensors at stage 56, segments of interest in stage 55 and the identification and classification at stage 54, the user specified events of stage 53 may be interpreted into a sequence of cause-effect events at stage 57. This information obtained at stages 54, 55, 56 and 57 may be placed into storage 43 and retrieved as needed at stage 58. The information at stage 58 may be provided to the user interface 13 at stage 59 and at stage 60 for control purposes by a user at interface 13 via control system 12 and plant controllers 16.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A flare characterization system comprising:
   at least one camera for obtaining video images of a flare emitted by a flare stack of a plant;
   a video analytics module connected to the at least one camera, the video analytics module analyzing the video images captured by the at least one camera to obtain a characterization of the flare, the characterization including an approximation of the three dimensional shape of the flare using a generalized cylinder defined by a medial axis and edges;
   a control system connected to the video analytics module; and
   a user interface connected to the control system, wherein video analytics module is configured to provide the characterization of the flare to the user interface via the control system, and the user interface is configured to display a visual sense of the characterization of the flare to a user;
   wherein the flare characterization system is configured to store the obtained video images of the flare for later retrieval, review, or regulatory purposes.

2. The system of claim 1, further comprising:
   a camera server connected to the at least one camera and the control system; and
   a video database server connected to the camera server and the control system.

3. The system of claim 1 further comprising at least one plant controller connected to the control system.

4. The system of claim 1, further comprising an alarm system connected to the control system.

5. The system of claim 1, wherein the video analytics module comprises:
   a digital video stream capture mechanism connected to the at least one camera; and
   a video stream analytics mechanism connected to the control system.

6. The system of claim 5, wherein the video stream analytics mechanism comprises an algorithm for obtaining a characterization of the flare according to video images captured by the at least one camera.

7. The system of claim 6, further comprising an automated flame control module connected to the video stream analytics mechanism and to the control system.

8. The system of claim 6, further comprising a flare controller, connected to the video stream analytics mechanism, for adjusting the flare as combustion in accordance with the characterization.

9. A method for flare characterization comprising:
   capturing a video stream of a flare of a flare stack of a plant with at least one camera;
   analyzing the video stream, the analysis including an analysis of the color of the flare and an analysis of the shape of the flare;
   characterizing the flare according to an analysis of the video stream and other plant information including wind speed and process control system sensors;
   presenting the characterization of the flare to a user via a user interface; and
   storing the video stream of the flare for later retrieval or review.

10. The method of claim 9, further comprising adjusting control parameters of the flare in accordance with a characterization of the flare.

11. The method of claim 9, further controlling an alarm in accordance with a characterization of the flare.

12. The method of claim 9, wherein the analyzing the video comprises:
    extracting segments of interest of the video stream;
    identifying events of the segments of interest;
    classifying identified events according to at least one video parameter of the flare;
    interpreting classified events; or
    providing information from an interpretation of the classified events for flare control purposes.

13. A video flare characterization system comprising:
    two or more cameras for obtaining video images of a flare mechanism;
    a video analytics module connected to the two or more cameras, wherein the video analytics module is configured to integrate information from a first silhouette obtained from a first camera and a second silhouette obtained from a second camera;
    a control system connected to the video analytics module; and
    a camera server connected to the two or more cameras and the control system, the camera server configured to store the video images of the flare mechanism with a digital signature to ensure proven authentication and integrity.

14. The system of claim 13, further comprising
    a video database server connected to the camera server and the control system.

15. The system of claim 13, farther comprising a flare controller connected to the control system.

16. The system of claim 15, wherein the flare controller is for controlling at least one parameter of a flare in the flare mechanism in accordance with a flare characterization output of the video analytics module.

17. The system of claim 13, further comprising a user interface connected to the video analytics module and for observing a flare characterization.

18. The system of claim 13, wherein the video analytics module is for extracting segments of interest of the video images, identifying events of the segments of interest, classifying identified events according to at least one video parameter of the flare mechanism, interpreting classified events, and/or providing information for flare control purposes from interpreted classified events.

19. The system of claim 13, further comprising an alarm system connected to a flare characterization output from the video analytics module.

* * * * *